United States Patent [19]

Sauter

[11] 4,022,289
[45] May 10, 1977

[54] BALANCE

[75] Inventor: Martin Sauter, Ebingen, Germany

[73] Assignee: Gottl. Kern & Sohn, Ebingen, Germany

[22] Filed: Nov. 6, 1975

[21] Appl. No.: 629,298

[30] Foreign Application Priority Data

July 14, 1975 Germany .......................... 2531417

[52] U.S. Cl. ................................. 177/247; 177/250
[51] Int. Cl.² ...................... G01G 1/32; G01G 21/26
[58] Field of Search .......... 177/246, 247, 248, 250, 177/252

[56] References Cited

UNITED STATES PATENTS

| | | | |
|---|---|---|---|
| 1,077,517 | 11/1913 | Fey | 177/247 |
| 1,779,263 | 10/1930 | Seederer | 177/250 |
| 2,473,084 | 6/1949 | Williams | 177/247 |

Primary Examiner—Joseph W. Hartary
Attorney, Agent, or Firm—Hans Berman

[57] ABSTRACT

A balance beam having a short arm carrying a weighing pan and a long arm whose weight counteracts the torque exerted by the pan on the beam has a longitudinal edge extending over both arms and notched at uniform intervals. A rider weight is movable along the beam for alternative engagement with the notches in the two arms, the spacing of the notches being greater than in an otherwise equivalent balance having notches in the long arm only, and manufacturing tolerances in the making of the notches thus have a smaller effect on the precision of the balance.

9 Claims, 7 Drawing Figures

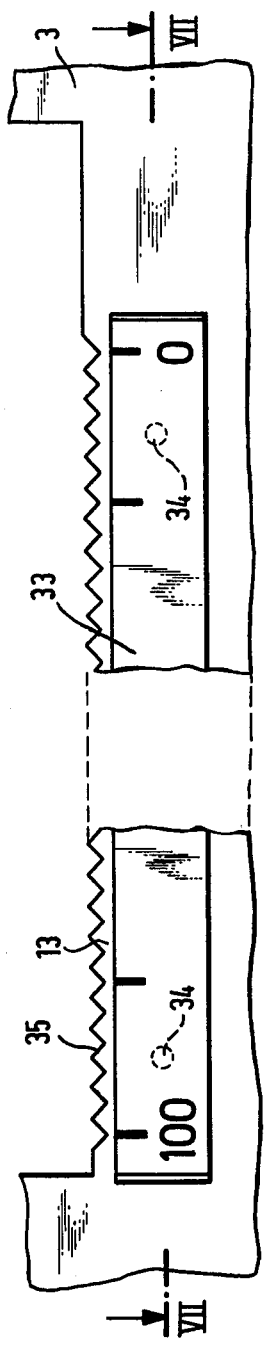
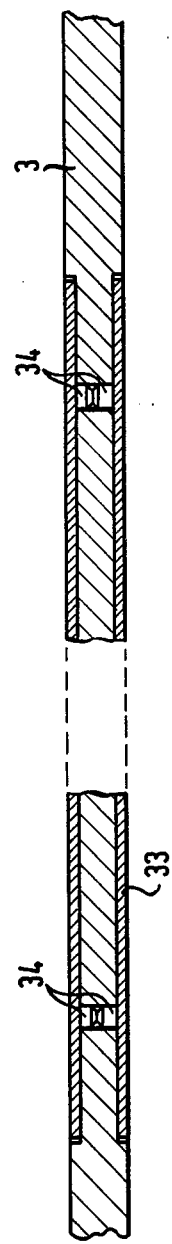

BALANCE

This invention relates to balances, and particularly to a balance in which a weighing pan is carried by one arm of a balance beam, and the weight of an object on the pan is determined by shifting a poise along the beam until the beam assumes a position of equilibrium.

Precisely to define the position of the poise, conventional balances of the type described have notches uniformly spaced along an edge of the arm not carrying the weighing pan, and indicia associated with the notches indicate the weight of the object on the pan.

The precision of the weighings obtained on such a balance is directly related to the uniformity of the notch spacings, more specifically to the linear manufacturing tolerance of the spacings. For a given tolerance, the precision of the known balance can be improved only by increasing the length of the poise-carrying arm and thereby increasing the unitary spacing of the notches. This length cannot be increased at will. The bulk of the balance is limited by practical considerations. The length of the beam also affects the oscillating period of the beam, and thus the time required for a weighing.

It is a primary object of this invention to improve the precision of a balance of the type described without change in the manufacturing tolerance and without increasing the length of the balance beam.

With this object and others in view, as will hereinafter become apparent, the balance of the invention has a beam which is supported on a main bearing of a base for pivoting movement about the bearing axis. Two arms of the beam extend longitudinally from the pivot axis in opposite directions. A longitudinal edge portion of each arm is formed with a plurality of uniformly spaced notches. A poise longitudinally movable on the beam is provided with an engaging device shaped for engagement with each of the notches on either arm of the beam. A single weighing pan is mounted on only one of the arms.

Because the notches are distributed along both arms of the beam, their spacing can be greater than in an otherwise equivalent balance in which the poise is shifted only along one arm. For a given manufacturing tolerance in positioning the notches, the spacing error, expressed as a fraction of the nominal spacing, is smaller, and the weighing precision higher in the balance of the invention than in the conventional balance.

Other features, additional objects, and many of the attendant advantages of this invention will readily be appreciated as the same becomes better understood by reference to the following detailed description of a preferred embodiment when considered in connection with the appended drawing in which:

FIG. 6 is an enlarged fragmentary rear view of the beam in the balance of FIG. 1; and FIG. 7 shows the beam of FIG. 6 in section on the line VII—VII.

Figure 1:
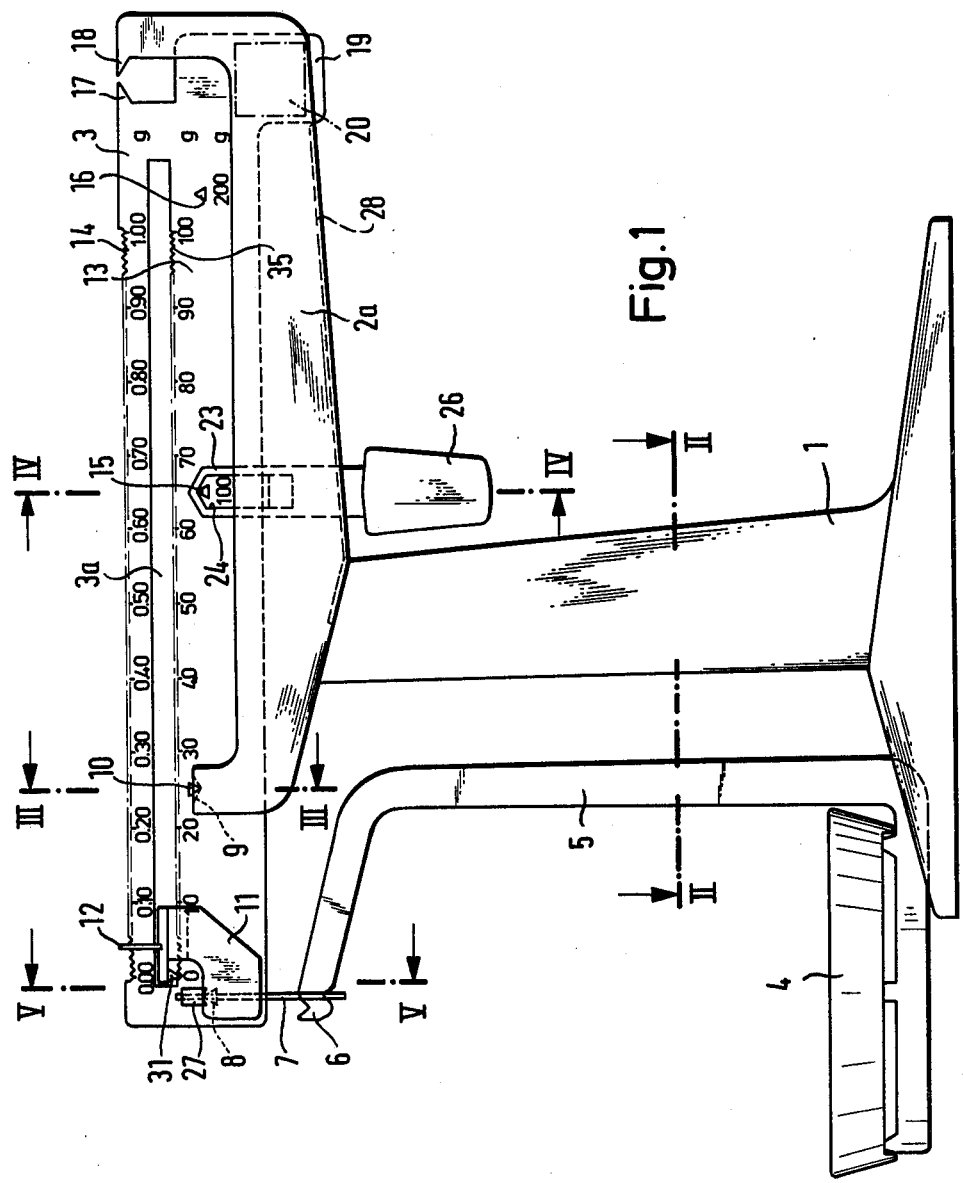
FIG. 1 shows a balance of the invention in front elevation.
Figure 2:
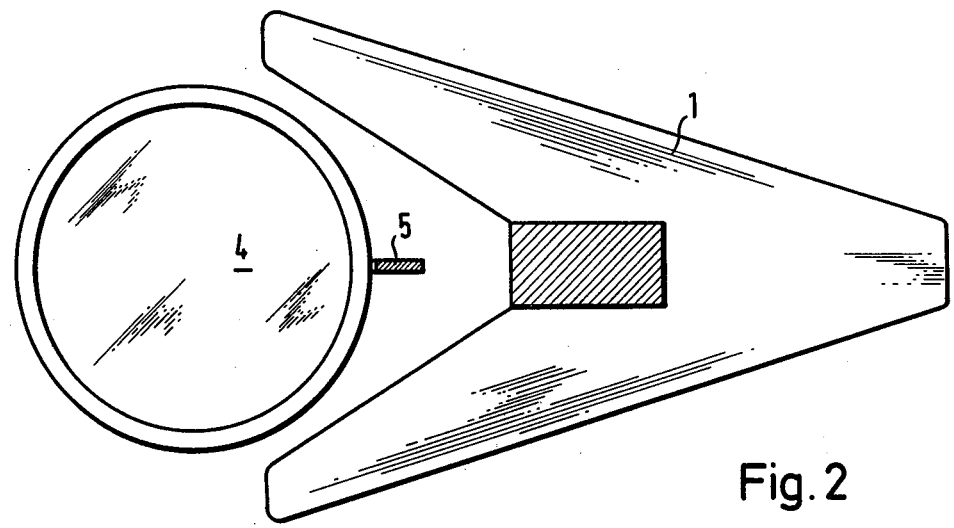
FIG. 2 is a sectional plan view taken on the line II—II in FIG. 1.
Figure 5:
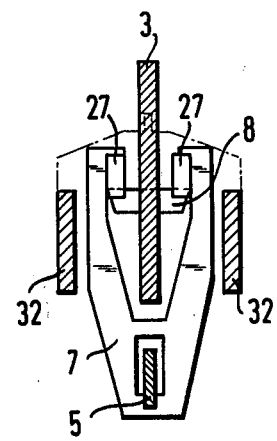

Referring initially to FIG. 1, there is seen a balance whose base consists of a normally upright cast-iron pillar 1 having an integral foot whose shape is evident from joint consideration of FIGS. 1 and 2, and of two elongated, normally horizontal, spacedly parallel supporting plates 2a, 2b. In the view of FIG. 1, the plate 2a obscures the almost identical plate 2b. The balance beam 3 is an approximately rectangular aluminum alloy plate. A weighing pan 4 is suspended from one longitudinal end of the beam 3 on a hanger 5, the top end 6 of the hanger being hook-shaped and engaged in an aperture of an approximately stirrup-shaped plate 7, as is best seen in FIG. 5. A knife edge member 8 projecting transversely from both major longitudinal faces of the beam 3 engages downwardly directed seating faces of bearing elements 27 on the plate 7 to provide an outer bearing.

The main bearing of the balance is constituted by bearing planes 9 on the supporting plates 2a, 2b on opposite sides of the beam 3 and by a knife-edge member 10 projecting from the major beam faces. The pivot axis of the main bearing defines the boundary between two arms of the beam 3, the shorter arm carrying the pan 4. A longitudinal slot 3a extends in the beam over much of its length so that the beam 3 has a normally upwardly directed, straight, longitudinal edge 13 in the slot 3a, and another analogous free edge 14.

Two rider weights 11, 12 may be moved along the edges 13, 14 respectively over most of the length of both arms of the beam 3. The range of the balance may be increased beyond that available from the weights 11, 12 by a supplemental weight 26 suspended from additional knife edge members 15, 16 which project from the longitudinal front face of the beam 3, the fulcrum of the knife edge member 15 being centered in the longer arm of the beam 3 between the pivot axis of the main bearing 9, 10 and the fulcrum of the knife edge member 16.

An arresting mechanism, conventional and not specifically shown, permits the beam 3 to be arrested in the illustrated equilibrium position in which a pointer 17 on the free end of the longer beam arm is aligned with a pointer 18 on the supporting plates 2a, 2b whose two longitudinal ends are connected transversely. The oscillations of the released beam about its equilibrium position are braked by eddy currents in an integral lug 19 of the beam 3 movably received between permanent magnets 20 on the plates 2a, 2b.

Figure 3:
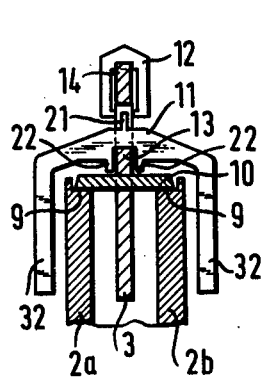
FIGS. 3 to 5 illustrate the balance of FIG. 1 in respective fragmentary, enlarged sections on the lines II—II, III—III, IV—IV, and V—V.

As is best seen in FIG. 3, the rider weight 11 is approximately U-shaped in section and symmetrical relative to the median longitudinal plane of the beam 3. Its bight portion carries a thin central rib 21 projecting upward and two ribs 22 projecting downward and movably receiving the edge 13 of the beam 3 therebetween. The two leg portions 32 of the weight 11 are spaced apart sufficiently to clear the plates 2a, 2b and the main bearing 9, 10 during longitudinal movement of the weight on the beam 3. As is best seen in FIG. 1, the leg portions 32 are enlarged longitudinally of the beam 3 so that the center of gravity of the weight 11 is well below the pivot axis of the main bearing 9, 10 when the main bearing is received in the downwardly open space defind between the bight and leg portions of the weight 11. A knife edge 31 of the weight 11, obscured in FIG. 3, but shown in FIG. 1, may be engaged with each of the transverse notches 35 which are uniformly spaced along the edge 13 so as to secure the weight on the beam 3 in a well-defined longitudinal position.

The rider weight 12, whose mass is one hundredth of the mass of the weight 11 in the illustrated embodiment of the invention, is a sheet metal plate of approximate U-shape. The free ends of its leg portions are turned toward each other so as to secure the weight 12 to the beam 3 without restricting its longitudinal movement, the larger weight 11 being similarly secured by being received in the slot 3a. The rib 21 passes between the turned ends of the weight 12 when the weights 11, 12 move past each other on the beam 3.

Figure 4:
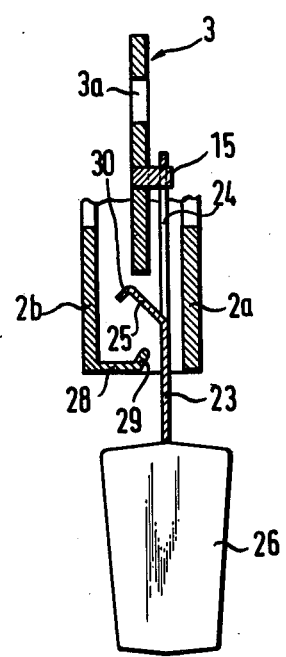

As is also shown in FIG. 4, the supplemental weight 26 is suspended from the knife edge member 15 by means of an apertured hanger plate 23. The material removed from the plate 23 to form the aperture 24 is still attached to the main portion of the plate to form a lug 25 bent out of the plane of the plate 23, the free end 30 of the lug being hook-shaped. A horizontal, integral flange 28 extends along the bottom of the supporting plate 2b over a distance greater than the spacing of the knife edge members 15, 16, and the free edge 29 of the flange 28 is turned up obliquely approximately parallel to the free end 30 of the lug 25.

The clearances between the plates 2a, 2b and the beam 3 are sufficient to permit the hanger plate 23 to be released from the knife edge member 25, to be lowered until the lug 25 rests on the flange 28, and to be moved along the flange into position below the knife edge member 26 to be raised and suspended there. However, the lug 25 and the flange 28 restrict movement of the supplemental weight 26 transversely away from the supporting plate 2b to a distance not substantially greater than necessary for transfer of the weight from the flange 28 to the knife edge member 15 or 16. When not used, the weight 26 remains suspended from the flange 28.

The positions of the weights 11, 12 on the notched edges 13, 14, while the pointers 17, 18 are aligned and the beam 3 is free to oscillate, are indicative of the weight of an object on the pan 4. As is best seen in FIGS. 6 and 7, the indicated weight may be read from strip-shaped scales 33 attached in shallow recesses of the upright longitudinal faces of the beam 3 by pins 34 received in bores of the beam 3 with a friction fit. FIG. 6 shows the rear face of the portion of the beam 3 below the slot 3a, and the attached scale is graduated in grams from 0 to 100. As not explicitly shown, the upper scale is graduated from 0.01 to 1.00 gram. The scales 33 may be replaced by others calibrated in ounces or carats or any other desired unit of weight, and the weight may be read from the front or the rear of the balance to the nearest 0.01 g. The supplemental weight 26 permits the range of the balance to be shifted between 0 – 100 g, 100 – 200 g, and 200 – 300 g.

While the illustrated shape of the rider weight 11 is preferred because it may be moved over practically the entire length of the beam 3, over the main bearing 9, 10 and the outer bearing 8, 27 in a particularly convenient manner evident from the drawing, a poise of different shape may be substituted without losing the basic advantages of this invention over a balance of the same general type in which the row of poise-positioning notches is limited to one arm.

It is a significant advantage of the illustrated balance that the supplemental weight 26, which normally is used less frequently than the other weights, cannot be mislaid or otherwise lost while not needed. If the balance of the invention is provided with more than the two specifically illustrated notched edges 13, 14, as in a conventional triple beam balance, a sliding poise associated with each of the additional notched edges may be secured against loss in a manner obvious from the drawing and from the description thereof.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:
1. A balance comprising:
 a. a base;
 b. a main bearing on said base defining an axis;
 c. an elongated beam supported on said main bearing for pivoting movement about said axis and having two arms of different length longitudinally extending from said axis in opposite directions, respective longitudinal edge portions of said arms being formed with a plurality of uniformly spaced notches;
 d. a rider weight of approximately U-shaped cross section longitudinally movable on said beam,
  1. said weight having two leg portions and a bight portion connecting said leg portions,
  2. said portions of the weight defining a space receiving said main bearing during longitudinal movement of said weight from one of said arms to the other arm;
 e. engaging means on said weight shaped for engagement with each of said notches for securing said weight in respective positions on either arm of said beam,
  1. the center of gravity of said weight being located below said axis when said edge portion are elongated horizontally and said main bearing is received in said space; and
 f. a single weighing pan mounted on the shorter arm of said beam.
2. A balance as set forth in claim 1, further comprising a supplemental weight, and fastening means on the other one of said arms for releasably fastening said supplemental weight to said beam.
3. A balance as set forth in claim 2, wherein said base includes an elongated supporting member carrying said bearing and extending from said bearing longitudinally of said beam in the direction of said other arm, and securing means for securing said supplemental weight to said supporting member.
4. A balance as set forth in claim 1, further comprising two elongated scales carrying weight indicating indicia, and fastening means for releasably fastening said scales to respective, opposite, longitudinal faces of said beam.
5. A balance as set forth in claim 1, wherein said edge portions of said arms are longitudinally aligned and jointly constitute an edge part of said beam, said notches being uniformly spaced over the length of said edge part.
6. A balance comprising:
 a. a base including an elongated supporting member;
 b. a main bearing on said supporting member defining an axis;
 c. an elongated beam supported on said main bearing for pivoting movement about said axis and having two arms of different length longitudinally extending from said axis in opposite directions,

1. respective longitudinal edge portions of said arms being each formed with a plurality of uniformly spaced notches,
2. said supporting member extending from said bearing longitudinally of said beam in the direction of the longer arm of said beam;

d. a poise longitudinally movable on said beam;
e. engaging means on said poise shaped for engagement with each of said notches for securing said poise in respective positions on either arm of said beam;
f. a single weighing pan mounted on the shorter one of said arms;
g. a supplemental weight;
h. fastening means on the longer one of said arms for releasably fastening said supplemental weight to said beam; and
i. securing means for securing said supplemental weight to said supporting member.

7. A balance as set forth in claim 6, wherein said poise is a rider weight of approximately U-shaped section, said weight having two leg portions and a bight portion connecting said leg portions, said portions of the weight defining a space receiving said main bearing during longitudinal movement of said weight from one of said arms to the other arm.

8. A balance as set forth in claim 7, wherein said beam has a longitudinal median plane, and said rider weight is symmetrical relative to said plane.

9. A balance as set forth in claim 6, wherein said securing means include means restricting movement of said supplemental weight away from said supporting member transversely to the direction of elongation of the supporting member to a distance not substantially greater than necessary for transfer of said supplemental weight from said supporting member to said fastening means on said other arm.

* * * * *